United States Patent [19]

Chang et al.

[11] Patent Number: 5,884,288
[45] Date of Patent: Mar. 16, 1999

[54] METHOD AND SYSTEM FOR ELECTRONIC BILL PAYMENT

[75] Inventors: Sheueling Chang, Cupertino; Robert Rochetti, Los Altos Hills, both of Calif.

[73] Assignee: Sun Microsystems, Inc., Palo Alto, Calif.

[21] Appl. No.: 762,710

[22] Filed: Dec. 9, 1996

Related U.S. Application Data

[63] Continuation-in-part of Ser. No. 673,918, Jul. 7, 1996, abandoned.

[51] Int. Cl.$^6$ .................................................. G06F 17/60
[52] U.S. Cl. ................................ 705/40; 705/39; 705/34; 235/379
[58] Field of Search ................................ 380/24; 705/40, 705/42, 30, 35, 34, 39; 235/379

[56] References Cited

U.S. PATENT DOCUMENTS

| | | | |
|---|---|---|---|
| 4,799,156 | 1/1989 | Shavit et al. | 364/401 |
| 5,220,501 | 6/1993 | Lawlor et al. | 364/408 |
| 5,283,829 | 2/1994 | Anderson | 380/24 |
| 5,383,113 | 1/1995 | Kight et al. | 364/401 |
| 5,699,528 | 12/1997 | Hogan | 705/40 |

FOREIGN PATENT DOCUMENTS

US97/22479  5/1998  WIPO .

OTHER PUBLICATIONS

Gerry VanDenengel, "Cards ON The Internet...Advertising on a $3 Bill" World Card Technology, pp. 46–48 Feb. 1995.
K. Strassel, "Dutch Software Concern Experiments With Electronic Cash in Cyberspace", Wall Street Journal Apr. 1995.
, Carnegie Mellon University Feb. 1995.

*Primary Examiner*—Emanuel Todd Voeltz
*Assistant Examiner*—Raquel Alvarez
*Attorney, Agent, or Firm*—Gary S. Williams Flehr Hohbach Test Albritton & Herbert LLP

[57] ABSTRACT

A method and system for providing a fully automated electronic bill processing capability that is integrated with banking institutions and their customers is herein disclosed. The electronic bill payment system includes a community of payors, payees, payor banks, and payee banks that are associated with computing systems-that are interconnected by a computer network. A payor bank receives electronic bills specifying payment requests from one or more payors having an account at the payor bank. The payor bank places a hold on the funds in the payor's account and then generates an electronic check that is transmitted to the payee. The payee receives an electronic check envelope that contains a number of electronic checks that are encrypted and digitally signed by the payor bank. The payee generates an electronic deposit including one or more endorsed electronic checks and a deposit slip. The electronic deposit is encrypted and digitally signed by the payee. The electronic deposit is transmitted to a payee bank that the payee is associated with. The payee bank authenticates the endorsed check and credits the payee's account accordingly.

18 Claims, 11 Drawing Sheets

User XYZ Outstanding Unpaid Bills

| Payee | Date Due | Amount | Payment Instruction |
|---|---|---|---|
| Mortgage Co. | 10/1 | $1,752.00 | |
| PG&E | 10/8 | $23.60 | |
| AT&T | 10/15 | $42.36 | |
| TV Cable Co. | 10/25 | $26.76 | |

FIG. 8B

METHOD AND SYSTEM FOR ELECTRONIC BILL PAYMENT

This application is a continuation-in-part of Ser. No. 08/673,918 filed Jul. 7, 1996, now abandoned. Application Ser. No. 08/673,918 is hereby incorporated by reference.

This invention relates to electronic communication systems and in particular to a method and apparatus for processing electronic bill payments between various financial institutions and clients connected by a network.

BACKGROUND OF THE INVENTION

There is a great demand to support on-line business transactions in a fully automated closed-loop information and payment exchange system. The demand is especially present in banking and financial applications that are partially automated.

For example, most banking institutions offer bill payment services through an outsourced third party. FIG. 1A shows one particular prior art bill payment system. A payor 100 sends an electronic mail message 101 authorizing an outsourced payment service 102 to pay one or more payees 104. The payment service 102 prints and mails a paper check on behalf of the payor 100 to each payee 104 specified by the payor 100. The payee 104 receives the paper check, endorses it, and deposits it with a bank 106 that the payee 104 is affiliated with. The payee's bank 106 clears the paper check with the payor's bank 110 through the Federal Reserve or local check clearing house organization 112.

FIG. 1B depicts a second prior art bill payment system. A payor 100 sends an electronic mail message 101 authorizing an outsourced payment service 102 to pay one or more payees 104. Typically, the payee is a large enterprise, such as a utility company. The payment service 102 collates several payments for a particular payor and sends to the payee's bank 106 an electronic check 117 that represents a lump sum payment. The electronic check 117 is received by the payee bank 106 and converted into a format 107 suitable for clearing with an Automatic Clearing House 108.

The payee's bank 106 issues the formatted check 107 to the Automatic Clearing House 108. The Automatic Clearing House 108 is part of the Federal Reserve Net Settlement System. Finally, at the designated time of day, the Automatic Clearing House 108 performs the check settlements and eventually performs a funds transfer by sending a credit 111 to the payee's bank 106 and a debit 109 to the payor's financial institution 110.

Additionally, the payment service 102 mails to the payee 104 a paper print out 113 detailing the payments made to the payee through the Automated Clearing House 108.

Although the prior art systems have worked well, they suffer a number of drawbacks. One problem with the system shown in FIG. 1A relates to the use of an intermediate outsourced service that relies on manual processing. The outsourced bill payment service 102 issues a paper check 103 that is mailed to the payee 104. The paper check 103 requires the payee 104 to physically deposit the check at the payee's bank 106. These steps increase the time that it takes for the payee 104 to receive payment. Another problem relates to the amount of time it takes to clear a transaction. Typically in the national system, funds are not settled for 2–3 days from the day the check is received by the institution. In order to assure the integrity and availability of funds, most institutions place holds on the availability of the funds until after checks clear. This causes inconveniences to both banks and end users.

The system shown in FIG. 1B, while using electronic checks, still requires substantial manual processing of payment information. What is needed is a fully automated bill payment system and method that is integrated with each banking institution and customer involved in a bill payment transaction.

FIG. 1C illustrates a proposed prior art bill payment system that is currently under discussion although not yet realized. A payor 100 electronically pays one or more bills by transmitting an electronic check 115 to a payee 104. The payee 104 electronically deposits the electronic check 116 in the payee's bank 106. The payee bank 106 settles the electronic check 116 with the payor's bank 110 through an electronic check clearing process 114.

A shortcoming of the prior art system of FIG. 1C is that it requires each electronic check to be digitally signed by its respective payor. The payors, as well as the banks and payees, must all be equipped with electronic check writing software and the appropriate hardware components, such as a Smart Card reader. The intended payor is the average consumer. It will take many years before this proposed system can be adopted by the average consumer and for the average personal computer to be equipped with a Smart Card reader. Also, having electronic checks generated by so many different parties inherently results in more mishaps and raises more issues of potential security breaches than "closed" systems where it is easier to verify the authenticity of payors and payees. Accordingly, there is a need for a more convenient means to facilitate electronic bill payment and one that has a greater assurance of security.

SUMMARY OF THE INVENTION

The present invention pertains to an electronic bill payment system and method. The electronic bill payment system includes a community of payors, payees, payor banks, and payee banks that are associated with computing systems that are interconnected by a computer network.

A payor bank receives electronic bill payment authorizations specifying payment requests from various payors having client accounts at the payor bank. The payor bank places a hold on the funds in each payor's account and then generates an electronic check that is transmitted through the network to the payee. The payee receives an electronic check envelope through its electronic mail system that contains a number of electronic checks that are encrypted and digitally signed by the payor bank. The payee can receive multiple electronic check envelopes from different -payor banks. The payee will process the payment it receives and updates its accounts receivable in the same manner that paper checks are processed. The payee generates an electronic deposit including one or more endorsed electronic checks and an electronic deposit slip. The electronic deposit is encrypted with the payee's digital certificate attached. The electronic deposit is transmitted through the network to the payee bank that the payee is associated with. The payee bank authenticates the endorsed check, clears the checks with the payor banks, and credits the payee's account accordingly.

An intended application of the present invention is for Internet electronic commerce. Each payor bank has a web server that provides its customers or payors access to web pages. The web pages can be used to elicit from the payor one or more outstanding bill payments that are to be paid using the electronic bill payment system. Alternatively, a payor can request electronic bill payments through other remote interface access means such a voice menu system that is accessed via a telephone line.

Each of the electronic transactions that are generated in the electronic bill payment system are transmitted over the Internet or through other electronic message transmission channels. Each transaction utilizes a digital certificate and a cryptographic technique to secure the. transaction. The electronic check includes the payor bank's digital certificate and information identifying the payor and the bill being paid. Each electronic deposit includes the payee's digital certificate and information identifying the payee account to be credited and the bill being paid. Each recipient of an electronic bill transaction verifies the received transaction before processing the transaction further.

BRIEF DESCRIPTION OF THE DRAWINGS

Additional objects and features of the invention will be more readily apparent from the following Detailed Description and appended claims when taken in conjunction with the drawings in which:

FIGS. 8A–8B illustrate exemplary bank web pages according to a preferred embodiment of the present invention.

DESCRIPTION OF THE PREFERRED EMBODIMENTS

Glossary

To assist the reader, the following glossary of terms used in this document is provided.

Payor: The party that requests electronic bill payment. For example, a payor can be a customer of a utility company. The payor interacts with the electronic bill payment system through a computing system and hence, the terms "payor" and "payor computer system" are used interchangeably.

Payee: The party that receives electronic payment. In the above example, the payee is the utility company. The payee interacts with the electronic bill payment system through a computing system and hence, the terms "payee" and "payee computer system" are used interchangeably.

Payor Bank: A bank or financial institution that handles the payor's banking or financial transactions. Preferably, the payor has an account established at the payor bank. The payor bank receives electronic bill payment instructions from the payor and submits an electronic check to the payee on behalf of the payor. The payor bank is associated with a computing system or financial transaction server that interfaces with the electronic bill payment system and processes the electronic bills. Hence, the term "payor bank" is used to refer to the associated computing system or financial transaction server.

Payee Bank: A bank or financial institution that handles the payee's banking or financial transactions. The payee has an account established at the payee bank. The payee bank receives electronic deposit slips from the payee having one or more digitally endorsed checks that are deposited into the payee's account at the payee bank. The payee bank is associated with a computing system or financial transaction server that interfaces with the electronic bill payment system and processes the electronic deposits. Hence, the term "payee bank" is used to refer to the associated financial transaction server.

Overview

Figure 5:
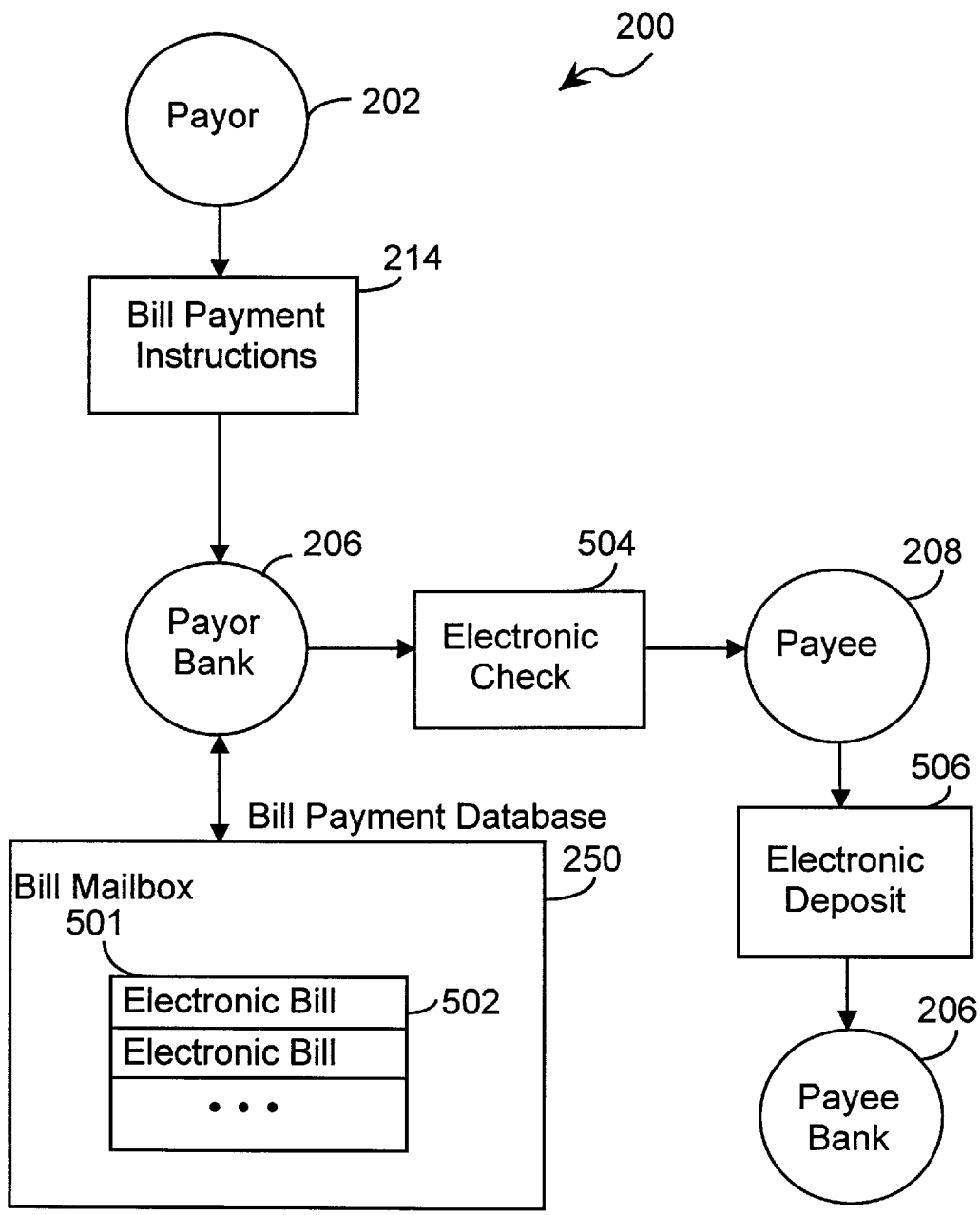
FIG. 5 illustrates the steps used in the electronic bill payment system of the present invention.

Referring to FIG. 5, the present invention pertains to a distributed electronic bill payment system and method for Internet commerce. The distributed electronic bill. payment system 200 includes a community of payors 202, payees 208, payor banks 206, and payee banks 206 that are associated with computing systems and interconnected by a public network, such as the Internet. An intended goal of the present invention is to minimize the number of parties requiring specialized resources (i.e., hardware and software) to utilize the electronic bill payment system 200. As such, the electronic bill payment system will have widespread application throughout the Internet community.

In a preferred embodiment of the present invention, one or more payors 202 access through the Internet, the Web server of an affiliated bank 206 at which the payor 202 maintains an account. The payor 202 can utilize a Web browser to view a Web page listing outstanding bills that can be electronically paid through the electronic payment system 200.

Alternatively, a payor 202 can use a dial-in telephone line to directly access the payor bank's electronic bill payment system. This option enables users without Internet access to utilize the electronic bill payment system.

The outstanding bills are transmitted to a payor bank 206 by one or more payees 208 affiliated with the electronic payment system 200. Typically, these payees can include utility companies, mortgage companies, and the like. Each payor has a respective bill mailbox 501 at the payor bank 206 that stores electronic bills 502 transmitted from these payees 208.

The Web browser allows each payor 202 to view the outstanding electronic bills 502 stored in the payor's bill mailbox 501. The Web browser also allows the payor 202 to formulate payment instructions 214 specifying the manner in which the electronic bills are to be paid, if at all. The electronic bill payment instructions 214 are transmitted to the payor bank 206 which then places a hold on the funds in the payor's account.

The payor bank 206 then collects multiple checks for a particular payee 208 and transmits them to the payee 208 in an electronic check envelope 504. The payee 208 can receive multiple electronic check envelopes from different payor banks 206. The payee 208 will process the payment it receives and updates its accounts receivable in the same manner that paper checks are processed. The payee 208 generates an electronic deposit 506 including one or more endorsed electronic checks and an electronic deposit slip. The electronic deposit 506 is encrypted and the payee's digital certificate is attached to it. The electronic deposit 506 is transmitted through the network to the payee bank 206 that the payee is associated with. The payee bank 206 authenticates the endorsed check, clears the checks with the payor's bank 206, and credits the payee's account accordingly.

System Architecture

Figure 1A:
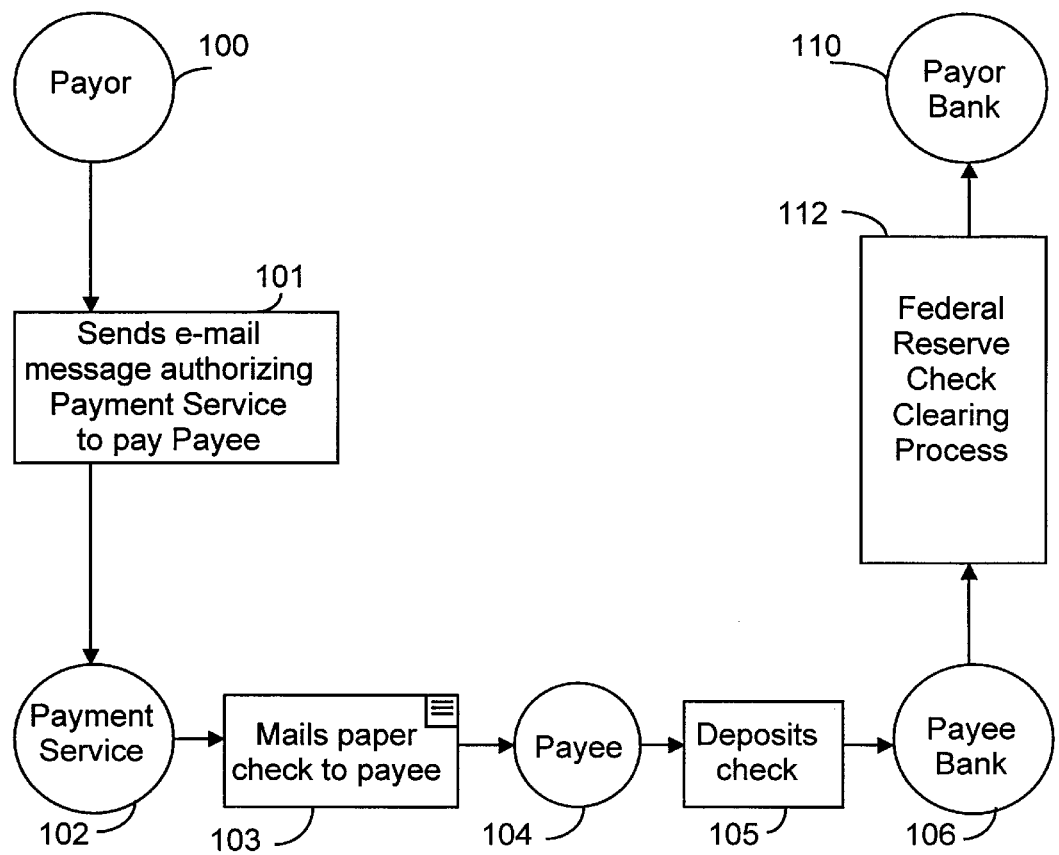
Figs. 1A–1C depict prior art electronic bill payment systems.
Figure 1B:
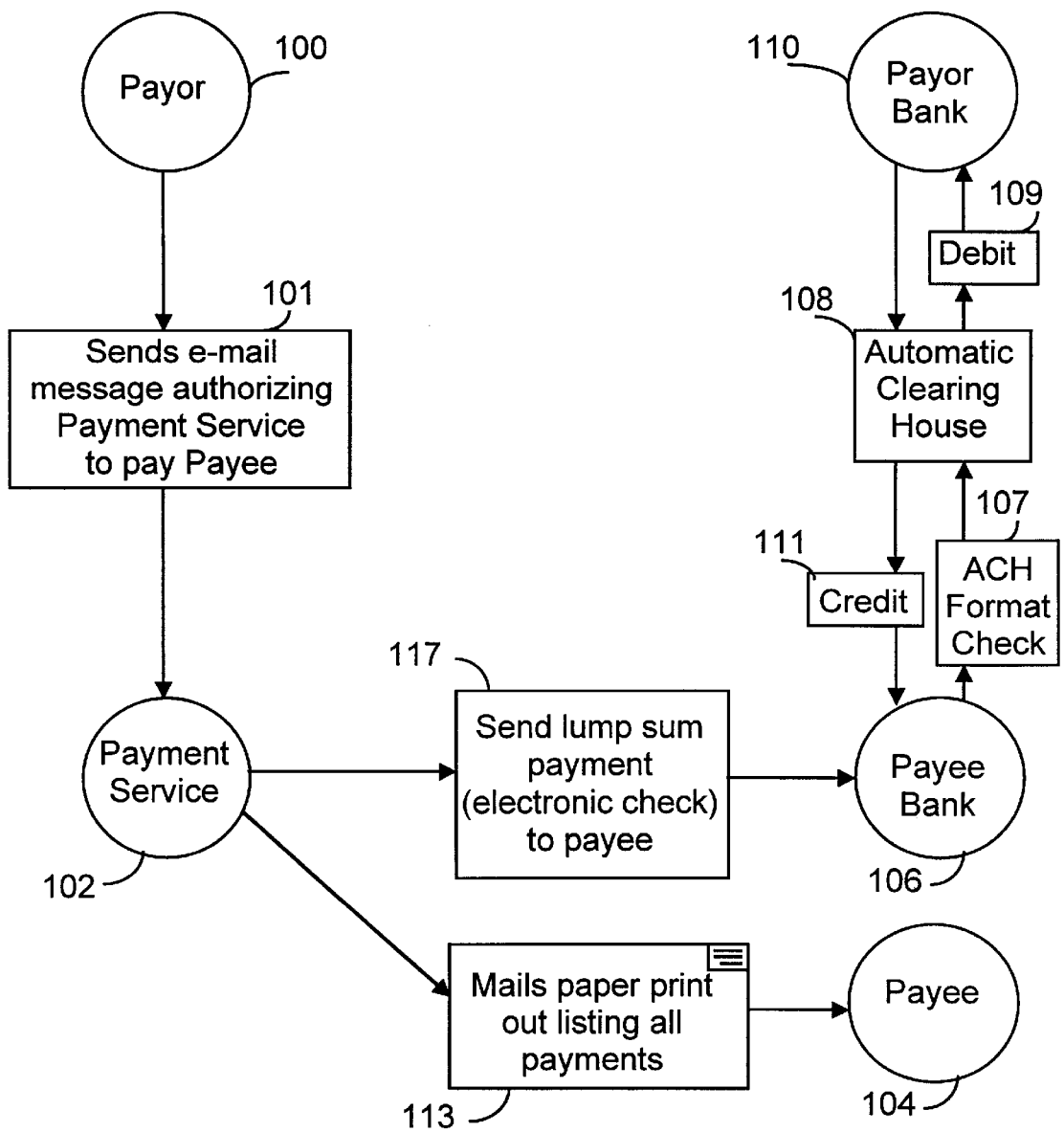
Figure 1C:
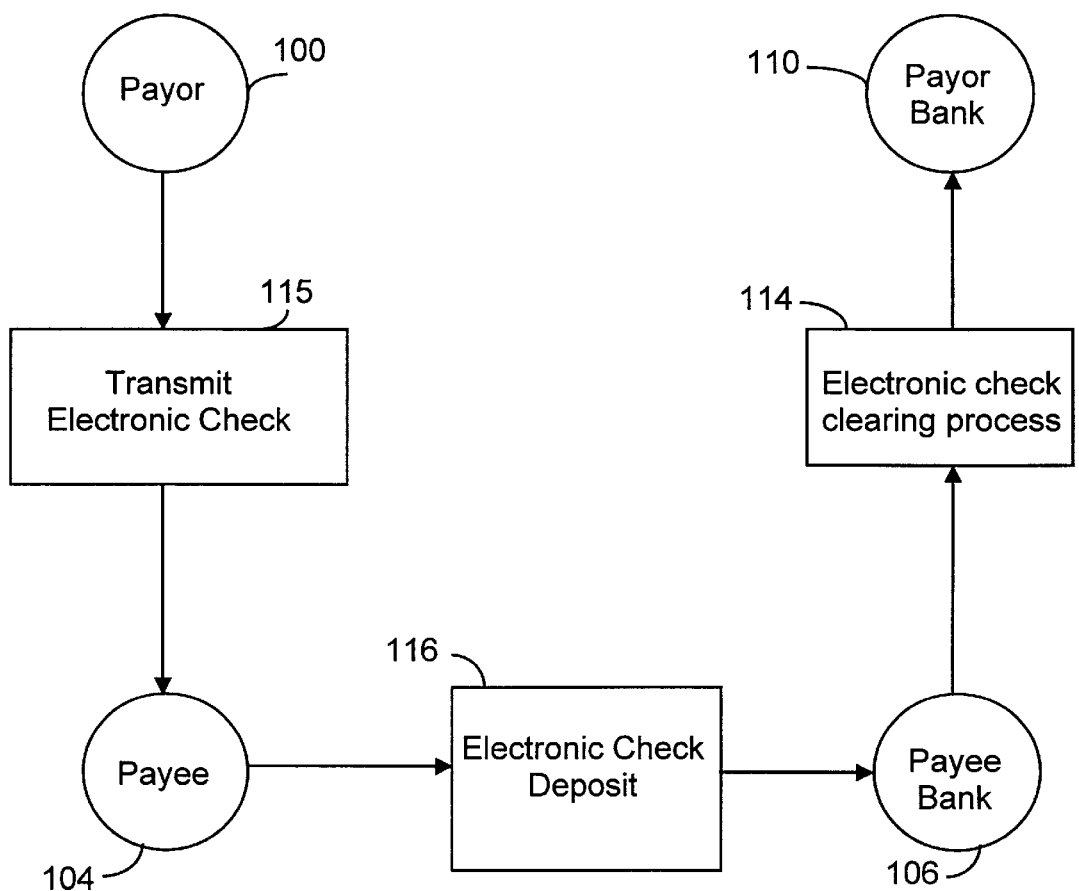
Figure 2:
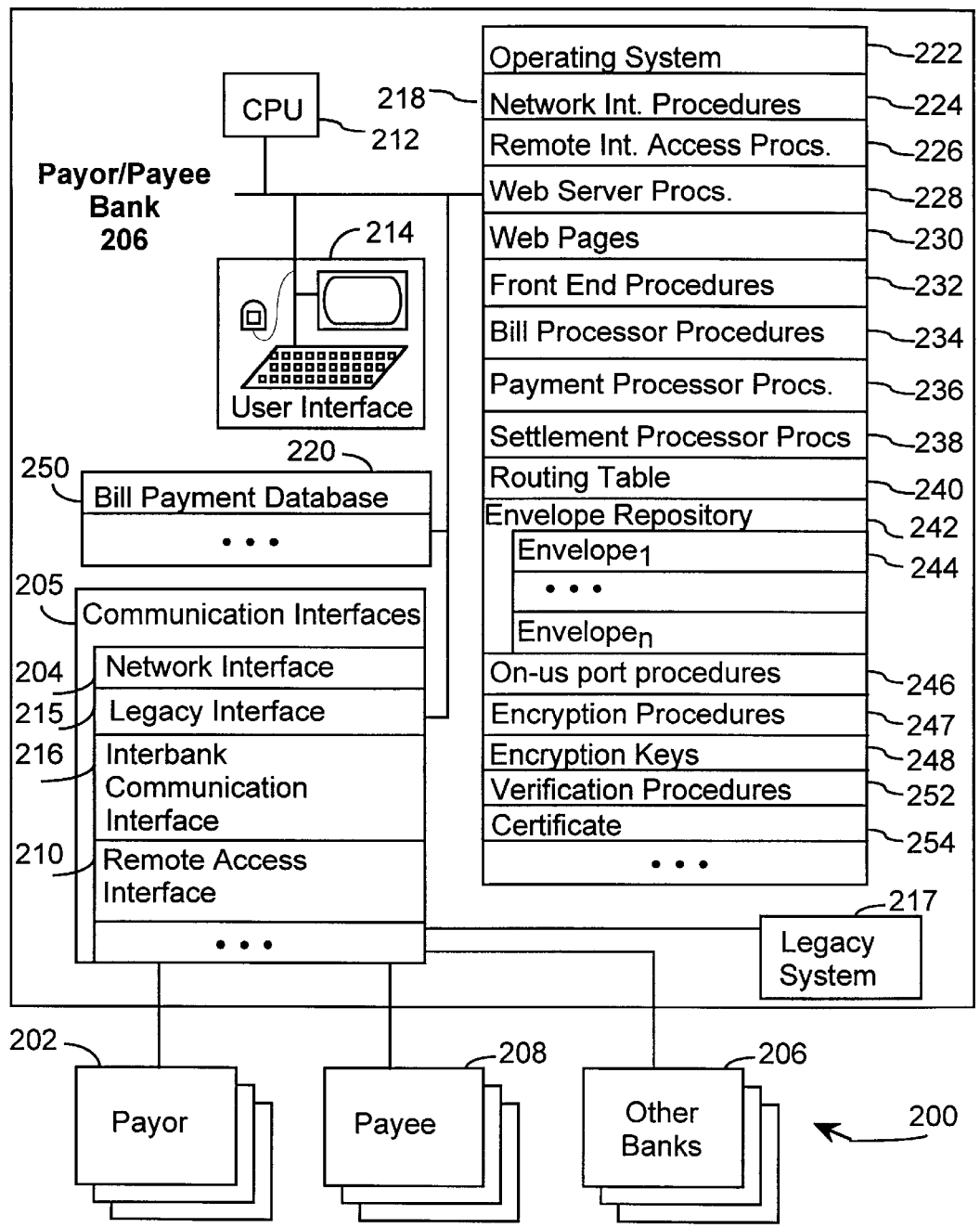
FIG. 2 shows an electronic bill payment system according to a preferred embodiment of the present invention.

Referring now to FIG. 2, a distributed electronic payment system 200 according to the preferred embodiment of the present invention is shown. The electronic payment system 200 can include one or more payors 202, one or more payees 208, one or more payor/payee banks 206 that are in communication with each other through a variety of communication interfaces 205.

In some situations, a bank 206 handles the accounts of both the payors and the payees. In other cases, the bank 206 handles only the accounts of the payors and in yet another scenario the bank 206 can handle the accounts of only payees. For the purposes of this application, the description of a bank in the distributed electronic bill payment system is described for the case where the bank represents both payees and payors and is denoted as the payor/payee bank 206. However, this invention is not constrained to this particular implementation. A person skilled in the art can easily alter the features of the payor/payee bank 206 to accommodate either electronic bill payment processing scenario.

The payor 202, payee 208, payor/payee bank 206 are associated with computer systems such as a personal computer, workstation, financial transaction server, and the like. A network interface 204 is provided for communication with a public network such as the Internet although any type of communications link or combination of communication links that enables electronic communication between the payor/payee bank 206 and one or more payees 208 and between the payor/payee bank 206 and one or more payors 202 can be employed. Alternatively, a payor 202 can also communicate directly with a payee/payor bank 206 through a remote access device 213 such as, but not limited to, a dial-up telephone line, via a remote access interface 210.

For the scenario where a bank represents different payors 202 and/or payees 208, the payor/payee bank 206 can communicate with other payor/payee banks 206 through an interbank communication interface 216 that is typically a private network. In addition, each payor/payee bank 206 has a legacy interface 215 for communication with an associated legacy system 217 (e.g., the bank's main frame computer system).

A payor/payee bank 206 includes a central processing unit (CPU) 212, a user interface 214, a primary memory 218, and a secondary memory 220. The secondary memory 220 can store a bill payment database 250 that stores for each payor's account a "bill mailbox" having information concerning pending bill payments and previously paid bills.

The primary memory 218 of the payor/payee bank 206 can include the following:

an operating system 222;

network interface procedures 224;

a remote access interface procedures 226;

web server procedures 228;

web pages 230;

front end processor procedures 232;

bill processor procedures 234;

payment processor procedures 236;

settlement processor procedures 238;

routing table 240;

envelope repository 242 that contains one or more electronic envelopes 244 containing a number of electronic checks that are transmitted to a number of payees;

on-us port procedures 246;

encryption procedures 247;

encryption keys 248;

verification procedures 252;

one or more certificates 254;

as well as other procedures and data structures.

A more detailed description of these components will be described below.

Figure 3:
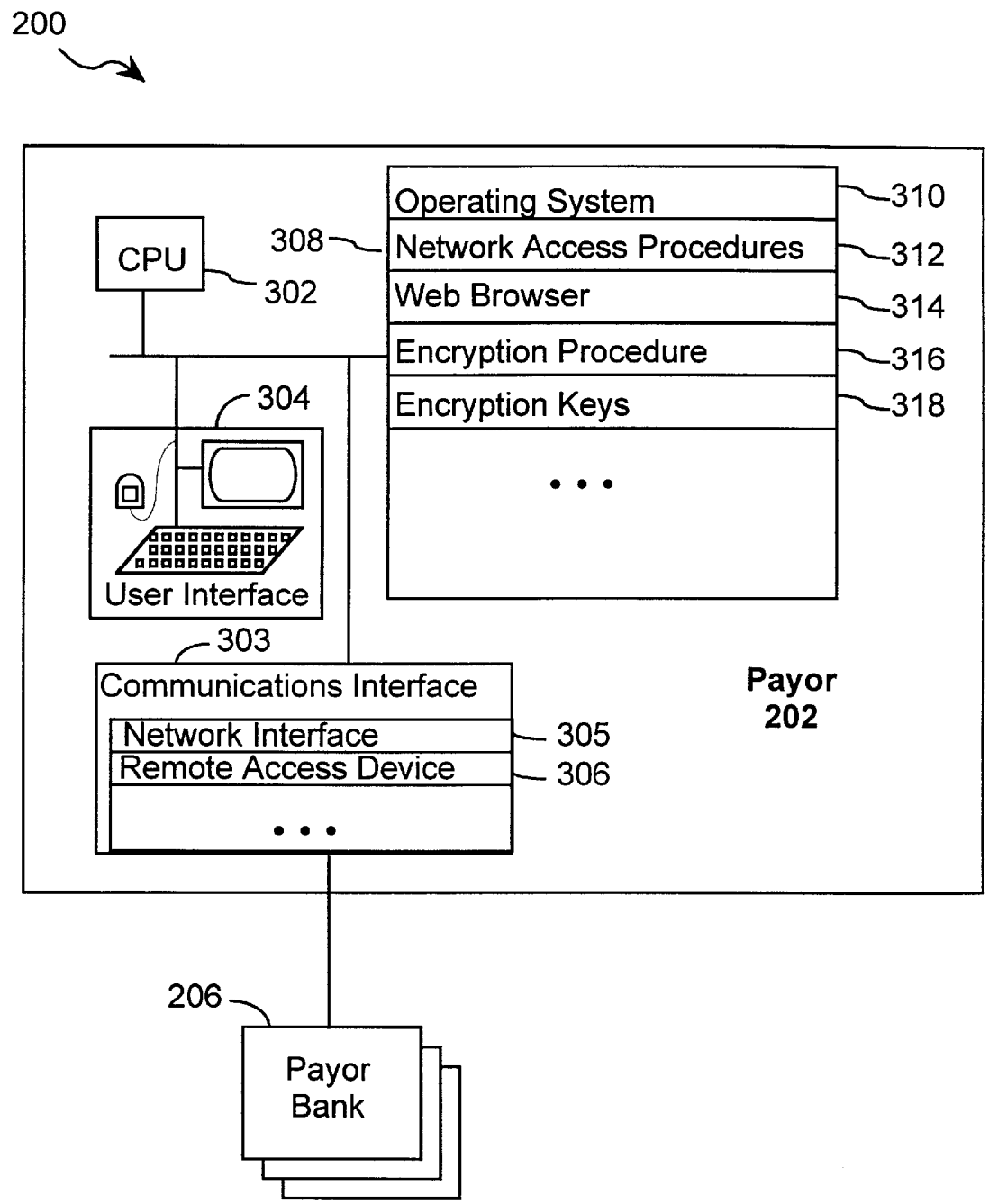
FIG. 3 shows a payor computer system according to a preferred embodiment of the present invention.

FIG. 3 illustrates the payor computer system 202 in a preferred embodiment of the present invention. The system 202 includes a central processing unit (CPU) 302, a user interface 304, a communications interface 303, and a primary memory 308. The communications interface 303 includes a network interface 305 that is used to communicate with one or more payor banks 206. Aternatively, a remote access interface 306 (e.g., a modem connected to a dial-up telephone line) can be used by the payor 202 to directly access the payor bank 206.

The primary memory 308 of the payor computer system 202 can include the following:

an operating system 310;

network access procedures 312;

a web browser 314;

an encryption procedure 316;

one or more encryption keys 318;

as well as other procedures and data structures.

Figure 4:
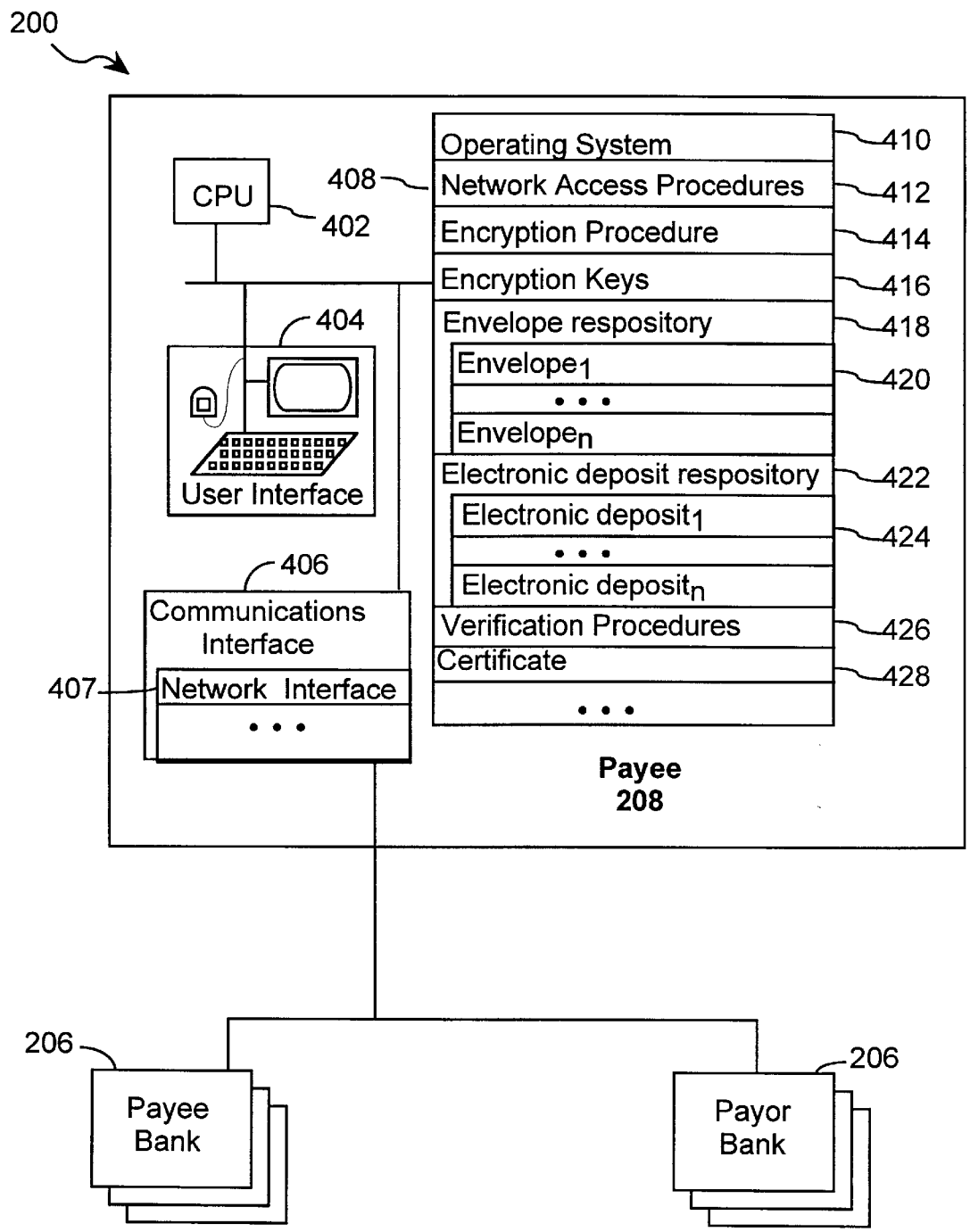
FIG. 4 shows a payee computer system according to a preferred embodiment of the present invention.

FIG. 4 illustrates the payee computer system 208 in a preferred embodiment of the present invention. The system 208 includes a central processing unit (CPU) 402, a user interface 404, a communications interface 406, and a primary memory 408. The communications interface 406 includes a network interface 407 that is used to communicate with one or more payee banks 206 and one and more payor banks 206.

The primary memory 408 of the payee computer system 208 can include the following:

an operating system 410;

network access procedures 412;

an encryption procedure 414;

one or more encryption keys 416;

an electronic envelope repository 418 that stores one or more electronic envelopes 420 containing a number of electronic checks;

an electronic deposit repository 422 that stores one or more electronic deposits 424 containing a number of deposit slips associated with one or more endorsed electronic checks;

verification procedures 426;

one or more certificates 428;

as well as other procedures and data structures.

Electronic Bill Payment System

FIG. 5 illustrates the interactions between each party of the electronic payment system 200. The bill payment database 250 of each payor bank 206 maintains a bill mailbox 501 or similar mechanism for each bill payment customer. Each customer's mailbox 501 stores a list of pending bills, and may also list recently paid bills.

A payor 202 (i.e., a bank customer using the bill payment service of the present invention) interacts with a payor bank 206 by logging onto the payor bank's Web server, or direct dial computer connection, or telephone dial-in connection. Once the user has identified his/her account, has been authenticated by the payor bank 206 and has cleared a security check (e.g., by providing a password), the payor 202 can review the bills in his/her mailbox 501, and can authorize payment of specified ones of the pending bills listed in the bill mailbox 501. In the preferred embodiment, the payor 202 can authorize immediate payment or payment at a specified future date. A payor 202 can also go through a pre-selected list of payees 208 and indicate the amount to pay each payee 208.

Each electronic bill 502 in the payor's bill mailbox 501 specifies one or more bill payments that the payor bank 206 is to process on behalf of the payor 202. Typically, each separate electronic bill 502 will have associated with it a single payment and a single payee along with remittance information that is described below. But in some instances a single electronic bill may designate two or more payees 208 with a separate payment to each, such as an integrated telephone bill where two or more companies are providing services but are billing the payor 202 together.

When the payor 202 authorizes payment of a specified electronic bill 502 (i.e., when the payor authorizes immediate payment or when the current date matches the previously authorized payment data for an electronic bill), the payor bank 206 checks that the payor's account has sufficient funds to cover the bill payments and debits the payor's account accordingly. The payor bank 206 then generates one or more electronic checks 504 on behalf of the payor 202. Each electronic check is digitally signed by the payor bank 206 and transmitted to the payee 208 designated by the corresponding electronic bill, preferably in electronic check envelopes. Enclosed in the electronic check envelope is the payor bank's digital certificate. Each electronic check envelope 504 is used to transmit multiple electronic checks as a single electronic message.

Each payee 208 receives an electronic check envelope that contains several electronic checks from the same payor bank 206. The payee 208 processes each electronic check 504 and updates its accounting records accordingly. The payee may receive multiple electronic payments through the day. The payee 208 then generates an electronic deposit 506 that includes multiple endorsed checks and an electronic deposit slip 506. The endorsed checks and the electronic deposit slip 506 are then forwarded to the payee bank 206 for deposit in the payee's account.

The electronic check 504 is preferably the payment instrument developed by the Financial Services Technology Consortium (FSTC). It can contain the following information:

payor identifier;

payor bank identifier;

payor's account number;

payee;

payee bank identifier;

an amount;

date of the check; and one or more comment fields.

The electronic deposit 506 includes a deposit slip along with one or more checks. The deposit slip can contain the payee's account number, a timestamp of the transmission, and the payee's digital signature and certificate. The payee's digital signature, in effect, is the payee's endorsement of the deposited checks.

The electronic transactions that are transmitted within the electronic bill payment system utilize a digital signal and certification protocol. Any of the well known digital signature and certification protocols can be used. A more detailed description of these protocols and techniques can be found in Schneider, *Applied Cryptography*, 2d ed., John Wiley & Sons, New York (1996), which is hereby incorporated by reference as background information.

Each electronic check 504 is "signed" with the payor bank's private key, encrypted, and then transmitted to the payee 208. The payee 208 decrypts the electronic check 504 and verifies the digital signature of the payor bank with the payor bank's public key. The electronic deposits are also digitally "signed" with the payee's private key 428, encrypted, and then transmitted to the payor bank 206. The payor bank 206 decrypts the electronic deposit and verifies the payee's digital signature with the payee's public key.

An advantage of the present invention is that only payees and banks (or other bill processing financial institutions) need to be equipped with the hardware and software necessary for generating electronic checks. As such, fewer parties in this distributed electronic payment system 200 are required to be equipped with the software and hardware which makes the system 200 easily adaptable for widespread commercial use.

Clearing and settlement of the electronic checks received by each payee bank 206 can be handled through electronic check clearing mechanisms such as the one described in U.S. patent application Ser. No. 08/673,918, filed Jul. 1, 1996, which is hereby incorporated by reference.

Figure 6:
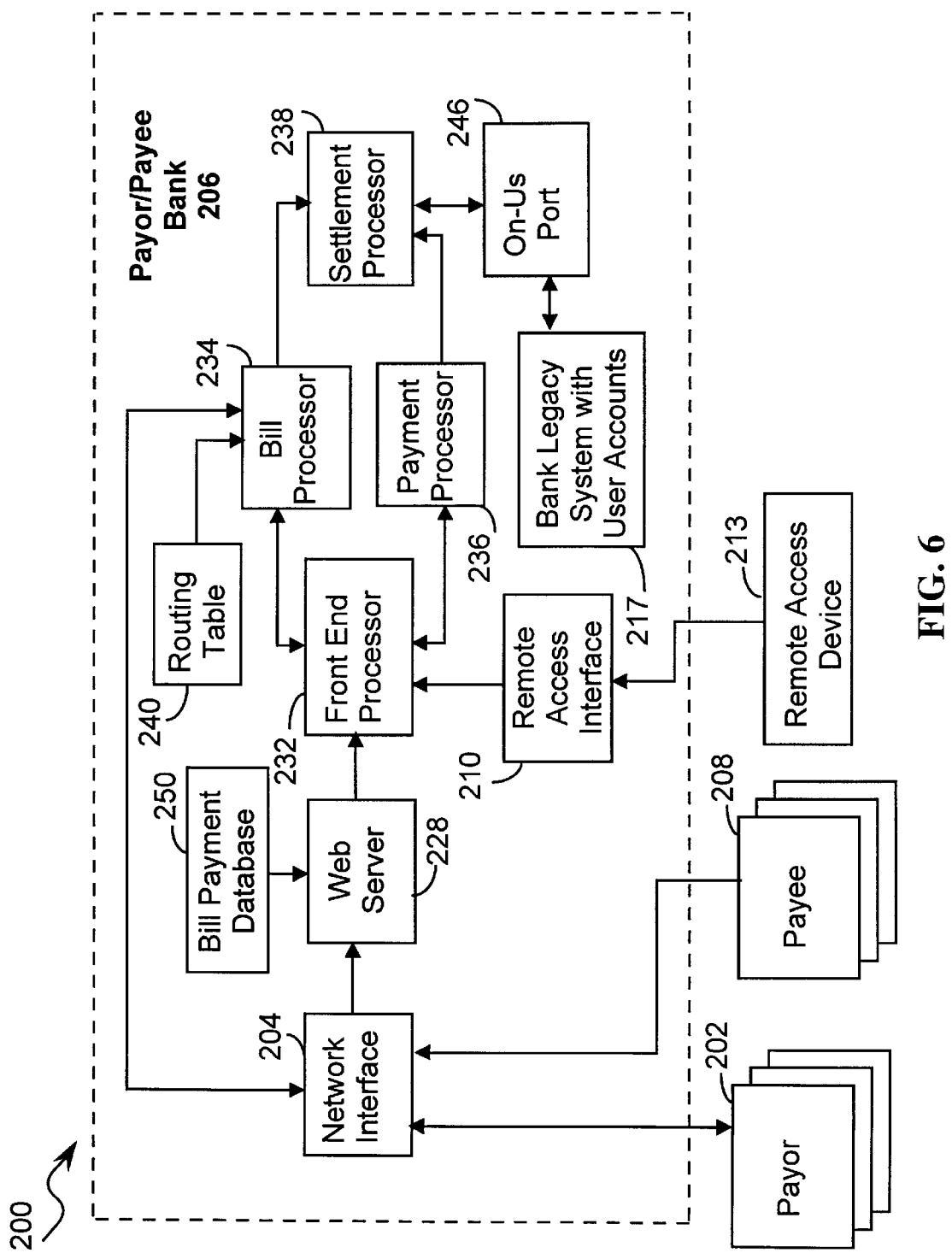
FIG. 6 is a block diagram of the components of the payor/payee bank according to a preferred embodiment of the present invention.
Figure 7:
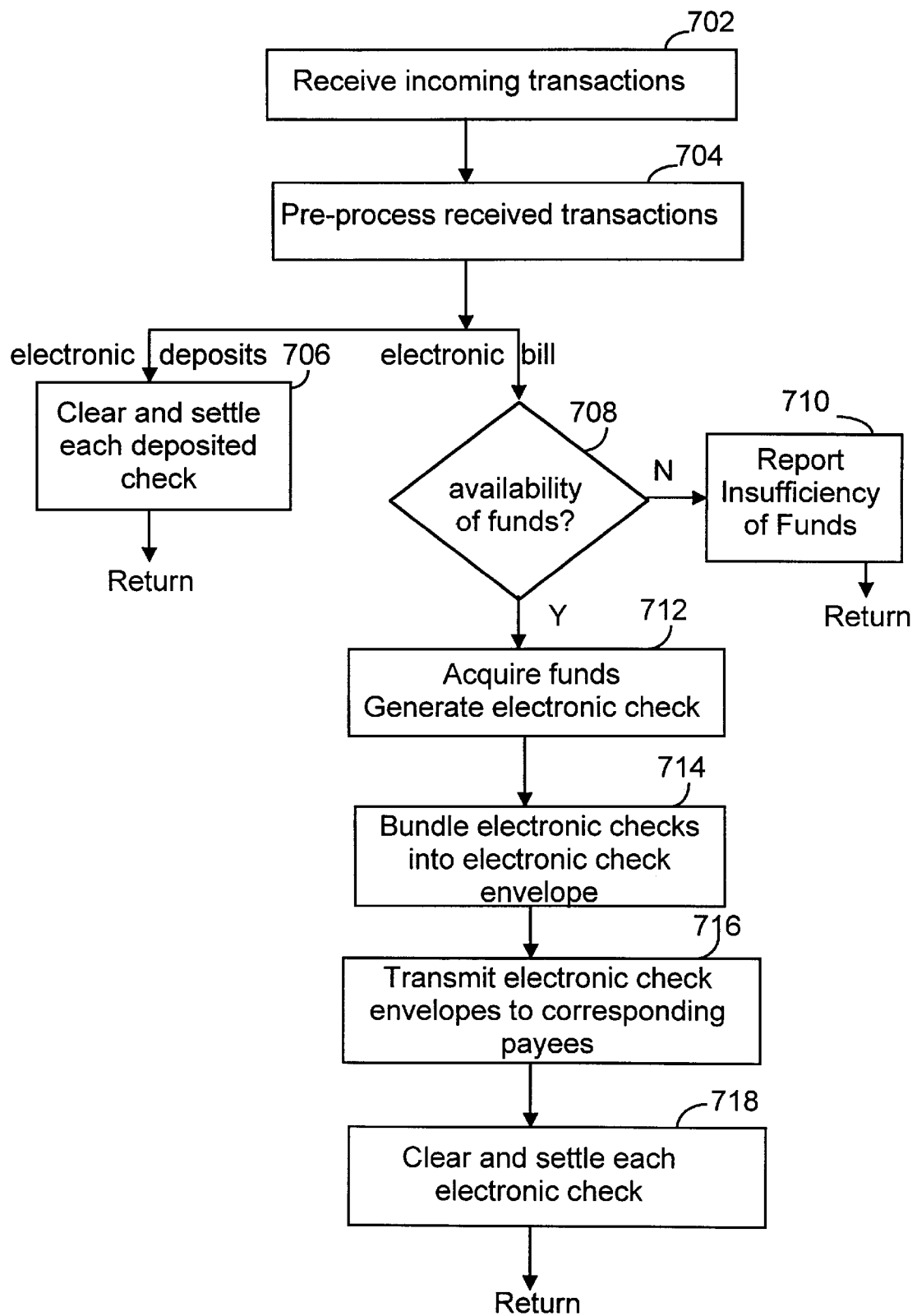
FIG. 7 illustrates the steps used by the payor/payee bank in processing electronic bills in a preferred embodiment of the present invention.

FIG. 6 is a block diagram of the payor/payee bank 206 in a preferred embodiment of the present invention and will be described in more detail below. FIG. 7 illustrates the steps used by the payor/payee bank 206 in processing the electronic transactions. Referring to FIGS. 6 and 7, each payor/payee bank 206 has a network interface 204 that enables the payor/payee bank 206 to receive and transmit transactions. Preferably, a payor 202 will transmit bill payment instructions to a payor bank 206 to pay bills 502 and the payor bank 206 transmits electronic checks to one or more payees 208. A payee 208 after receiving electronic checks from one or more payor banks 206, transmits electronic deposits 506 to a payee bank 206.

Referring to FIGS. 2, 6 and 7, a Web server 228 is coupled to the network interface 204 of a payor/payee bank 206 and provides access for each payor 202 to request one or more electronic bill payment services through the Internet. Each payor bank's Web server 228 provides a payor 202 with one or more web pages 230 that the payor 202 uses to select one or more electronic bill payment services. Examples of such services include setting up a bill payment account (i.e., establishing a bill mail box to which payees can send electronic bills), viewing outstanding bills that are pending payment, authorizing immediate or future payment of specified ones of the outstanding bills, and viewing previous electronic bill payments.

The Web server 228 has access to a bill payment database 250 that stores data pertaining to each payor's bill payment account (i.e., the bill mailboxes 501 are associated with each payor).

Figure 8A:
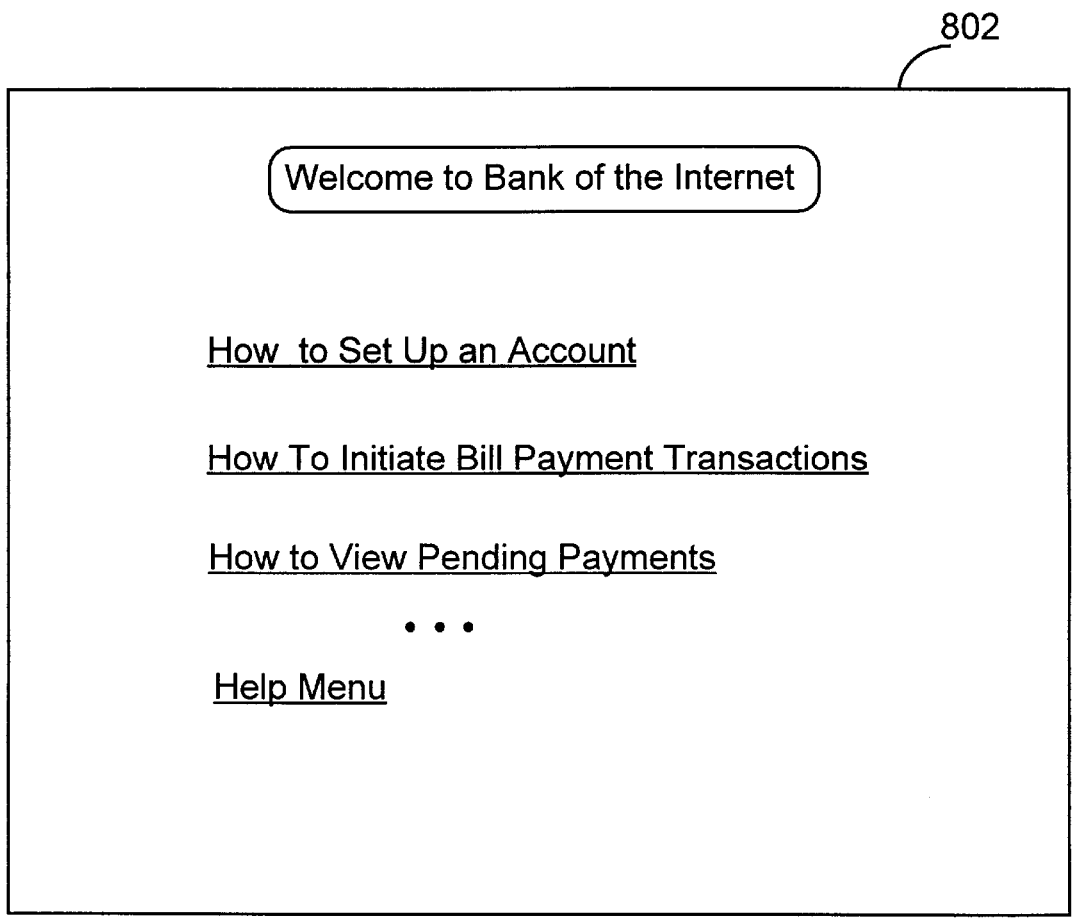

FIGS. 8A–8B illustrate exemplary web pages that the bank's Web server 228 can provide to a payor 202. Referring to FIGS. 2, 3, and 8A–8B, the payor 202 views the bank's web pages 230 through a web browser 314. One web page 802 can consist of a menu outlining the services that are provided to a payor 202. Another web page 804 can list each of the outstanding bills that are pending payment. A payment instruction field 806 is provided that allows the payor 202 to indicate the manner in which the payment is to be processed. Several options are available such as, but not limited to, the election to pay the payee 208 on a specified date, to hold the payment for a later date, to discard the payment and so on.

The payment instructions 806 and other payment information are then formatted, encrypted, and transmitted to the Web server 228 to the front-end processor 232.

Alternatively, a payor 202 can communicate with the payor bank 206 through a remote access interface 210. The remote access interface 210 can be a dial-up telephone connected to a voice menu system. The voice menu system prompts the payor 202 for those pending bill payments that the payor 202 may wish to pay through the electronic bill payment system 200. The bill processor 236 formats the instructions into one or more electronic bills 502 that are forwarded to the front-end processor 232.

A front end processor 232 receives electronic transactions from one or more payors 202 and payees 208 (step 702) and performs an initial pre-processing of those transactions (step 704). The electronic transactions can consist of electronic bills 502 that are initiated from one or more payors 202 and electronic deposits 506 that are transmitted from one or more payees 208. Electronic deposit transactions are tested to determine whether they meet defined integrity criteria (e.g., verification of the associated digital signatures) and transaction requests not meeting those criteria are rejected. The integrity criteria are the same as or similar to conventional integrity criteria for electronic financial transactions and are not the subject of this document.

After the electronic transactions have been pre-processed by the front end processor 232, they are transferred to the appropriate processor 234 or 236 depending upon the transaction type. Electronic bills 502 or requests for bill payments are transferred to the bill processor 234 and electronic deposits 506 are transferred to the payment processor 236.

The payment processor 236 performs verification of the syntax of the electronic deposit slips and the endorsed electronic checks that are included in an electronic deposit 506. The electronic deposit slips and the endorsed electronic checks are then transferred to the settlement processor 238 (step 706). The primary function of the settlement processor 238 is to "clear and settle" each endorsed check. Since each endorsed check is associated with one of its own client or payee accounts, the transactions are forwarded to the "on-us" port 246 of its own bank in order that the payee's account is credited appropriately (step 706). The "on-us" port 246 of each bank couples the bank's internal transaction processing system 217 (or legacy system) with that of the payee bank's financial transaction server 206.

The bill processor 234 processes each received electronic bill 502. First, a check is made to determine if the payor's account has the requested funds (step 708). If the payor's account cannot satisfy the payment request, the payee 208 is notified of the insufficiency (step 710). Otherwise, an automatic transfer of the funds or the setting of a "hold" on equal amount of funds in the payee's account is made. The bill processor 234 then generates an electronic check 504 for the electronic bill payment (step 712).

Electronic checks 504 having a common payee are bundled into a "check envelope" (step 714) and transmitted to the payee 208 (step 716). Each check envelope is an encrypted electronic message that holds a set of electronic checks that have been "signed" with the payor bank's digital signature. In one embodiment, the bill processor 234 will transmit the check envelopes in bundles at a pre-defined time in the day to the various payees 208 connected in the electronic payment system 200. In an alternate embodiment, packets of check envelopes are transferred to payees 208 more frequently, and in yet another alternative embodiment check envelopes are transferred between payees 208 continuously in real time.

The bill processor 234 uses a routing table 240 to determine the destination of the computing system that is associated with each payee 208 that is forwarded an electronic check envelope. The routing table 240 maps a payee's identifier into a network identifier suitable for routing the check envelopes.

The bill processor 234 then transmits to the settlement processor 238 a log specifying the checks that have been generated. The settlement processor 238 maintains an account balance with respect to each payor's account against which a transfer of funds was made and for each payee's account for which a credit of funds was made. The settlement processor 238 interacts with the appropriate payor and payee banks involved in each electronic bill payment in order to settle the transaction (step 718). A more detailed description of this settlement process is described in application Ser. No. 08/673,918.

Alternate Embodiments

While the present invention has been described with reference to a few specific embodiments, the description is illustrative of the invention and is not to be construed to limiting the invention. Various modifications may occur to those skilled in the art without departing from the true spirit and scope of the invention as defined by the appended claims.

For example, the electronic bill payment system can be modified so that any bank can receive electronic deposits from any payee regardless of whether the payee has a client account at the bank. In this case, the bank utilizes the settlement and processing system that is detailed in application Ser. No. 08/673,918.

Moreover, the present invention has been described with each bank having the functionality of both a payee bank and a payor bank. However, the present invention is not limited to this configuration. A bank can be configured to represent the payee bank, payor bank, or both payor/payee bank.

Additionally, the present invention has been described with reference to a Web server and dial-up telephone line as the preferred means for requesting bill payments. However, the present invention is not limited to these means. A person skill in the art would be able to modify the present invention to utilize other technologies that provide a payor with the capability of initiating bill payments. Examples of such technologies include, but are not limited to, the use of phone transmissions through the Internet (e.g., WebTalk from Quaterdeck), electronic mail, a gopher server, a ftp server, etc.

Further, the method and system described hereinabove is amenable for execution on various types of executable mediums other than a memory device such as a random access memory. Other types of executable mediums can be used, such as but not limited to, a computer readable storage medium which can be any memory device, compact disc, or floppy disk.

What is claimed:

1. An electronic financial transaction server, associated with a financial institution, comprising:

a memory for storing a plurality of client account data, each of a first subset of said client account data representing a payee associated with a payee client computer in communication with said electronic financial transaction server, each of a second subset of said client account data representing a payor associated with a payor client computer in communication with said electronic financial transaction server;

a communications interface for receiving one or more electronic bills from one or more of said payee client computers, each of said electronic bills having associated therewith a payor and a payee; and a bill processing mechanism that processes each of said electronic bills with respect to an associated client account data, said bill processing mechanism including instructions to automatically determine if said associated client account data for each of said electronic bills indicates a sufficient payor account balance to pay said electronic bill, to generate an electronic check for each of said electronic bills for which a sufficient payor account balance is available and to transmit each said electronic check to a payee client computer associated with the payee of a respective electronic bill.

2. The server of claim 1, wherein said communications interface further receives one or more electronic deposits from one or more payee client computers, each of said electronic deposits having associated therewith a payee account identifier at said financial institution; and further comprising a payment mechanism that processes each of said electronic deposits with respect to each said associated client account data.

3. The server of claim 2, wherein:

each of said electronic deposits includes a digital signature from a respective payee client computer.

4. The server of claim 1, wherein:

a web server provides each of said payor client computers with network capabilities for initiating said electronic bills.

5. The server of claim 1, wherein:

a remote interface access mechanism provides a telephonic communication capability for each said payor to initiate said electronic bills.

6. The server of claim 1, wherein:

each of said electronic bills includes a digital signature from a respective payee client computer; and each of said electronic checks includes a digital signature from said generating electronic financial transaction server.

7. A computer-implemented method for electronic bill payment processing at an electronic financial transaction server associated with a financial institution, said method comprising the steps of:

providing said server with a communication link to a plurality of client computers and server computers, each of said server computers associated with a different financial institution from said financial institution, a first subset of said client computers associated with payors, each of said payors having an account at said financial institution, a second subset of said client computers associated with payees, each of said payees having an account at said financial institution;

storing in said server a plurality of account data, each account data corresponding to one of said payor and payee accounts at said financial institution;

receiving at least one electronic bill from at least one payee client computer, each of said electronic bills having a designated payor and a designated payee;

automatically determining for each said received electronic bill if the account data corresponding to said designated payor indicates a sufficient account balance to pay said electronic bill;

generating, on behalf of one of said payors, an electronic check for paying one or more of said received electronic bills for which a sufficient account balance is available; and transmitting electronically each of said electronic checks to a payee client computer associated with the designated payee of a respective electronic bill.

8. The method of claim 7, further comprising the steps of:

receiving at least one electronic deposit from at least one payee client computer, each of said electronic deposits including one or more electronic checks and a designated payee account associated with said financial institution; and processing each of said received endorsed electronic checks by updating a respective designated payee account associated therewith.

9. The method of claim 8, further comprising the step of:

providing each of said payor client computers with an electronic communication capability for initiating said electronic bills.

10. A computer readable storage medium containing a computer code mechanism for use with an electronic financial transaction server associated with a financial institution, said computer code mechanism comprising:

a plurality of client account data, each of a first subset of said client account data representing a payee associated with a payee client computer in communication with said electronic financial transaction server, each of a second subset of said client account data representing a payor associated with a payor client computer in communication with said electronic financial transaction server;

a communications interface for receiving one or more electronic bills from one or more of said payee client computers, each of said electronic bills having associated therewith a Payor and a payee; and a bill processing mechanism that processes each of said electronic bills with respect to an associated client account data, said bill processing mechanism including instructions to automatically determine if said associated client account data for each of said electronic bills indicates a sufficient payor account balance to pay said electronic bill, to generate an electronic check for each of said electronic bills for which a sufficient account balance is available and to transmit each said electronic check to a payee client computer associated with the payee of a respective electronic bill.

11. The medium of claim 10, wherein said communication interface further receives one or more electronic deposits from one or more payee client computers, each of said electronic deposits having associated therewith a payee account identifier at said financial institution; and further comprising a payment mechanism that processes each of said electronic deposits with respect to each said associated client account data.

12. The medium of claim 11, wherein:

each of said electronic deposits includes a digital signature from a respective payee client computer.

13. The medium of claim 10, wherein:

a web server provides each of said payor client computers with network capabilities for initiating said electronic bills.

14. The medium of claim 10, wherein:

a remote interface access mechanism provides a telephonic communication capability for each said payor to initiate said electronic bills.

15. The medium of claim 10, wherein:
each of said electronic bills includes a digital signature from a respective payee client computer; and
each of said electronic checks includes a digital signature from said generating electronic financial transaction server.

16. A computer network for electronic bill payment, said network comprising:
a plurality of payor computer systems, each of said payor computer systems initiating one or more electronic checks;
a plurality of payee computer systems, each of said payee computer systems initiating one or more electronic bills and one or more electronic deposits; and
a plurality of financial transaction servers, each of said financial transaction servers associated with a financial institution and comprising:
a memory for storing a plurality of client account data, each of a first subset of said client account data associated with one of said payor computer systems, each of a second subset of said client account data associated with one of said payee computer systems;
a communications interface for providing electronic communication with each of said payor computer systems and with each of said payee computer systems; and
a bill processing mechanism that processes each of said electronic bills with respect to an associated client account data, said bill processing mechanism including instructions to automatically determine if said associated client account data for each of said electronic bills indicates a sufficient pay or account balance to pay said electronic bill, to generate an electronic check for each of said electronic bills for which a sufficient payor account balance is available and to transmit each said electronic check to a payee client computer associated with the payee of a respective electronic bill;
wherein said computer network transmits each said electronic bill from a respective payee computer system to a designated financial transaction server, transmits each said electronic check from a respective financial transaction server to a designated payee computer system, and transmits each said electronic deposit from a respective payee computer system to a particular financial transaction server.

17. An electronic financial transaction server, associated with a financial institution, comprising:
a memory for storing a plurality of client account data, each of a first subset of said client account data representing a payee associated with a payee client computer in communication with said electronic financial transaction server, each of a second subset of said client account data representing a payor associated with a payor client computer in communication with said electronic financial transaction server;
a communications interface for receiving one or more electronic bills from one or more of said payee client computers, each of said electronic bills having associated therewith a payor and a payee;
a bill processing mechanism that processes each of said electronic bills with respect to an associated client account data, said bill processing mechanism including instructions to generate an electronic check for each of said electronic bills and to transmit each said electronic check to a payee client computer associated with the payee of a respective electronic bill; and
a settlement mechanism including instructions to update each client account data associated with each said received electronic bill.

18. A computer readable storage medium containing a computer code mechanism for use with an electronic financial transaction server associated with a financial institution, said computer code mechanism comprising:
a plurality of client account data, each of a first subset of said client account data representing a payee associated with a payee client computer in communication with said electronic financial transaction server, each of a second subset of said client account data representing a payor associated with a payor client computer in communication with said electronic financial transaction server;
a communications interface for receiving one or more electronic bills from one or more of said payee client computers, each of said electronic bills having associated therewith a payor and a payee;
a bill processing mechanism that processes each of said electronic bills with respect to an associated client account data, said bill processing mechanism including instructions to generate an electronic check for each of said electronic bills and to transmit each said electronic check to a payee client computer associated with the payee of a respective electronic bill; and
a settlement mechanism including instructions to update each client account data associated with each said received electronic bill.

* * * * *